United States Patent
Weiss et al.

(10) Patent No.: US 11,939,908 B1
(45) Date of Patent: Mar. 26, 2024

(54) CONTROLLING A VARIABLE GEOMETRY TURBOCHARGER AND AN INTAKE THROTTLE VALVE TO OPTIMIZE EXHAUST GAS TEMPERATURE AND COMPRESSOR OUTLET PRESSURE OF AN ENGINE

(71) Applicant: Caterpillar Inc., Peoria, IL (US)

(72) Inventors: Kevin Weiss, Peoria, IL (US); Timothy Adam Bazyn, Chilicothe, IL (US); Derek Tanis, Peoria, IL (US); Sylvain J. Charbonnel, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/933,570

(22) Filed: Sep. 20, 2022

(51) Int. Cl.
*F02B 37/24* (2006.01)
*F02D 41/00* (2006.01)
*F02D 41/14* (2006.01)

(52) U.S. Cl.
CPC .......... *F02B 37/24* (2013.01); *F02D 41/0007* (2013.01); *F02D 41/1401* (2013.01); *F02D 41/1446* (2013.01); *F02D 2041/1412* (2013.01); *F02D 2041/1433* (2013.01); *F02D 2200/0406* (2013.01); *F02D 2200/101* (2013.01)

(58) Field of Classification Search
CPC ......... F02D 41/1446; F02D 2200/0406; F02B 33/44; F02B 33/446; F02B 37/22; F02B 37/24
See application file for complete search history.

(56) References Cited

U.S. PATENT DOCUMENTS

| | | | |
|---|---|---|---|
| 7,918,090 B2 | 4/2011 | Suzuki et al. | |
| 8,752,364 B2 | 6/2014 | Guo et al. | |
| 10,982,605 B2 | 4/2021 | Were et al. | |
| 11,365,697 B2 | 6/2022 | Nair et al. | |
| 2014/0214308 A1 | 7/2014 | Mulloy et al. | |
| 2018/0187615 A1* | 7/2018 | Lahti | F02D 41/0007 |
| 2022/0056854 A1 | 2/2022 | Robel et al. | |
| 2022/0120232 A1 | 4/2022 | Nair et al. | |

* cited by examiner

*Primary Examiner* — Ngoc T Nguyen
(74) *Attorney, Agent, or Firm* — Harrity & Harrity, LLP

(57) ABSTRACT

A controller may identify a plurality of sets of potential parameters associated with operation of an engine, wherein each set of potential parameters includes a potential setting of a turbine of a variable geometry turbocharger (VGT) of the engine and a potential setting of an intake throttle valve (ITV) of the engine. The controller may determine, based on the plurality of sets of potential parameters, a plurality of sets of predicted values, wherein each set of predicted values includes a predicted outlet pressure of a compressor of the VGT and a predicted temperature of an exhaust gas of the engine. The controller may determine respective scores of the plurality of sets of predicted values, and may select, based on the respective scores, a particular set of predicted values of the plurality of sets of predicted values. The controller may thereby control the turbine of the VGT and the ITV.

20 Claims, 4 Drawing Sheets

CONTROLLING A VARIABLE GEOMETRY TURBOCHARGER AND AN INTAKE THROTTLE VALVE TO OPTIMIZE EXHAUST GAS TEMPERATURE AND COMPRESSOR OUTLET PRESSURE OF AN ENGINE

TECHNICAL FIELD

The present disclosure relates generally to controlling a variable geometry turbocharger (VGT) and an intake throttle valve (ITV) and, for example, to controlling a VGT and an ITV to optimize exhaust gas temperature and compressor outlet pressure of an engine.

BACKGROUND

Internal combustion engines, such as diesel engines, produce exhaust gas that contains a variety of pollutants. These pollutants may include, for example, particulate matter (e.g., soot), nitrogen oxides (NOx), and/or sulfur compounds. In some cases, an engine may include a particulate collection device and/or an exhaust aftertreatment device to remove and/or convert particulate matter and/or the other pollutants in the exhaust gas. The particulate collection device and/or the exhaust aftertreatment device may use heat from the exhaust gas, in conjunction with an oxidation catalyst (e.g., a diesel oxidation catalyst (DOC)), to facilitate removing and/or converting the particulate matter and/or other pollutants (e.g., as part of a regeneration process). However, under certain operating conditions (e.g., when the engine is idling, when environmental temperatures are low, and/or the like), an exhaust gas temperature may fall below a minimum operating temperature for the particulate collection device, the aftertreatment device, and/or the like to operate in an efficient and/or effective manner.

Further, in some cases, when controlling components of the engine to cause the exhaust temperature to be greater than the minimum operating temperatures, an airflow of the engine is reduced. This impacts a transient response performance of the engine (e.g., the engine is not able to respond to a sudden increase in load because the engine is air-to-fuel ratio limited).

U.S. Pat. No. 11,365,697 (the '697 patent) discloses controlling a VGT of an engine and/or an ITV to control an intake manifold absolute pressure (IMAP) of an engine and thereby control an exhaust gas temperature (e.g., of an exhaust gas produced by the engine) to facilitate a regeneration process. While the '697 patent is effective at controlling an exhaust gas temperature by controlling a VGT and/or an ITV, the controller of the present disclosure controls a VGT and/or an ITV of an engine to provide an engine performance that balances exhaust gas thermal management goals and transient response goals.

Accordingly, the controller of the present disclosure solves one or more of the problems set forth above and/or other problems in the art.

SUMMARY

In some implementations, a method includes identifying, by a controller, a desired outlet pressure of a compressor of a variable geometry turbocharger (VGT) and a desired temperature of an exhaust gas of the engine; identifying, by the controller, a plurality of sets of potential parameters associated with operation of the engine, wherein each set of potential parameters includes a potential setting of a turbine of the VGT of the engine and a potential setting of an intake throttle valve (ITV) of the engine; determining, by the controller and based on the desired outlet pressure of the compressor, the desired temperature of the exhaust gas, and the plurality of sets of potential parameters, a plurality of sets of predicted values, wherein each set of predicted values includes a predicted outlet pressure of the compressor and a predicted temperature of the exhaust gas, and wherein each set of predicted values is associated with a set of potential parameters of the plurality of sets of potential parameters; determining, by the controller, respective scores of the plurality of sets of predicted values; selecting, by the controller and based on the respective scores of the plurality of sets of predicted values, a particular set of predicted values of the plurality of sets of predicted values; and controlling, by the controller and based on a particular set of potential parameters of the plurality of sets of potential parameters that is associated with the particular set of predicted values, the turbine of the VGT and the ITV.

In some implementations, a machine comprises an engine; a VGT; an ITV; and a controller. The controller is configured to: identify one or more sets of potential parameters associated with operation of the engine, wherein each set of potential parameters includes a potential setting of a turbine of the VGT and a potential setting of the ITV of the engine; determine one or more sets of predicted values that are respectively associated with the one or more sets of potential parameters, wherein each set of predicted values includes a predicted outlet pressure of a compressor of the VGT and a predicted temperature of an exhaust gas of the engine; determine respective scores of the one or more sets of predicted values; select, based on the respective scores of the one or more sets of predicted values, a particular set of predicted values of the one or more sets of predicted values; and control, based on the particular set of predicted values of the one or more sets of predicted values, the turbine of the VGT and the ITV.

In some implementations, a system comprises an engine; a VGT; an ITV; and a controller. The controller is configured to: identify one or more sets of potential parameters associated with operation of the engine, wherein each set of potential parameters includes a potential setting of a turbine of the VGT and a potential setting of the ITV of the engine; determine one or more sets of predicted values that are respectively associated with the one or more sets of potential parameters, wherein each set of predicted values includes a predicted outlet pressure of a compressor of the VGT and a predicted temperature of an exhaust gas of the engine; select a particular set of predicted values of the one or more sets of predicted values; and control, based on the particular set of predicted values of the one or more sets of predicted values, the turbine of the VGT and the ITV.

DETAILED DESCRIPTION

This disclosure relates to a controller, such as an engine control module (ECM), controlling a VGT and/or an ITV of an engine to control an outlet pressure of a compressor of the VGT and a temperature of an exhaust gas of the engine. In this way, the controller can reduce a transient response time of an output of the engine and reduce emission levels in the exhaust gas. The controller, the VGT, and/or the ITV, as described herein, have universal applicability to any machine utilizing such a controller, VGT, and/or ITV. The term "machine" may refer to any machine that performs an operation associated with an industry such as, for example, mining, construction, farming, transportation, or any other industry. As some examples, the machine may be a vehicle, an off-highway truck, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other above ground equipment, underground equipment, aerial equipment, or marine equipment.

Figure 1:
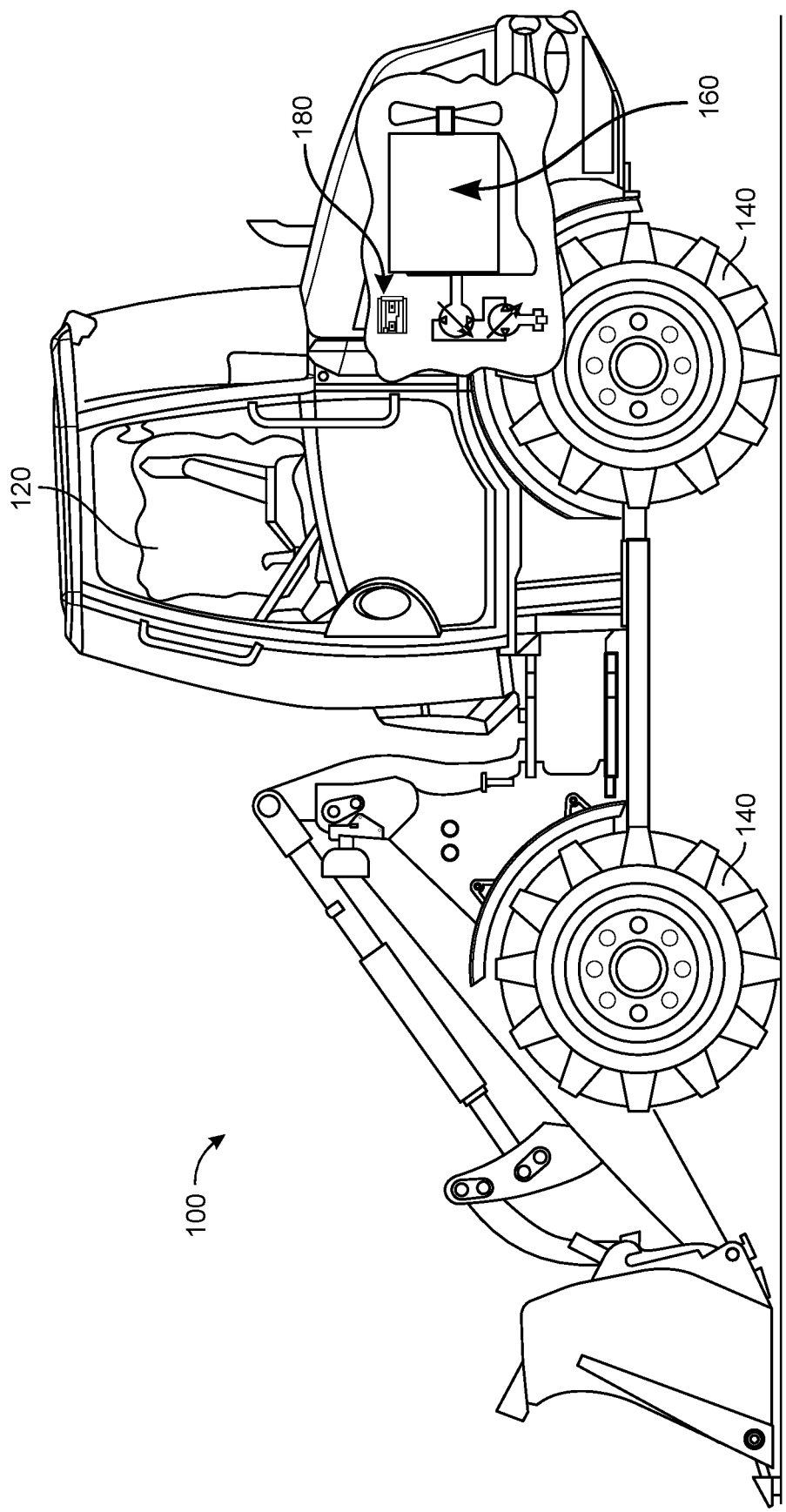
FIG. 1 is a diagram of an example machine described herein.

FIG. 1 is a diagram of an example machine 100 described herein. For example, machine 100 may include a mobile machine, such as the wheel loader shown in FIG. 1, or any other type of mobile machine. Machine 100 may include an operator station 120, one or more traction devices 140 (sometimes referred to as ground engagements), an engine 160 operatively connected to provide power to drive at least one of traction devices 140, and a controller 180 (e.g., an ECM) connected to one or more components of machine 100. The controller 180 may perform operations related to controlling a VGT and/or ITV of the engine 160 to control an outlet pressure of a compressor of the engine 160 and/or a temperature of an exhaust gas produced by the engine 160, as described in more detail elsewhere herein.

As indicated above, FIG. 1 is provided as an example. Other examples may differ from what is described in connection with FIG. 1.

Figure 2:
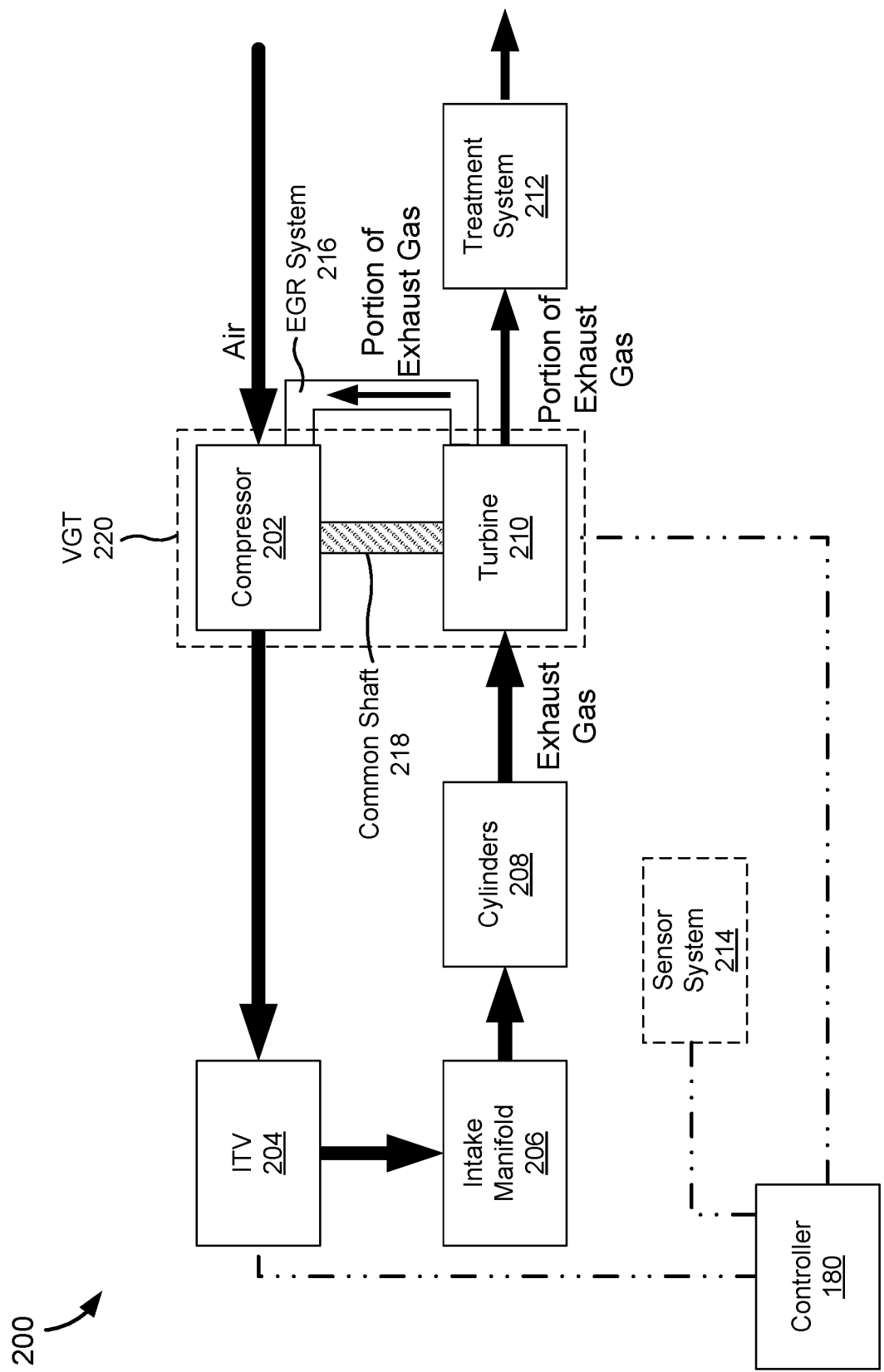
FIG. 2 is a diagram of an example engine system described herein.

FIG. 2 is a diagram of an example engine system 200 described herein. The engine system 200 may include a compression ignition, internal combustion engine, such as the engine 160, but may include any other type of internal combustion engine. The engine system 200 may be fueled by such fuels as distillate diesel fuel, biodiesel, dimethyl ether, gaseous fuels, such as hydrogen, natural gas, and propane, alcohol, ethanol, and/or any combination thereof. As shown in FIG. 2, the engine system 200 may include a compressor 202, an ITV 204, an intake manifold 206, a plurality of cylinders 208 (e.g., six or more cylinders), a turbine 210, a treatment system 212, a sensor system 214, the controller 180, and/or one or more other components (not shown).

As further shown in FIG. 2, air (e.g., ambient air from an environment external to the engine system 200) may be introduced into the engine system 200, such as via the compressor 202. In some implementations, an exhaust gas (e.g., produced by the plurality of cylinders 208 of the engine system 200) may be provided to the compressor 202 (e.g., via an exhaust gas recirculation (EGR) system 216), and therefore the compressor 202 may introduce air and the exhaust gas into the engine system 200. The compressor 202 may pressurize and provide the air (or the air and the exhaust gas) to the ITV 204. The ITV 204 may selectively regulate (e.g., restrict or allow) a flow of the air (or the air and the exhaust gas) into the intake manifold 206. The intake manifold 206 may mix and distribute the air (or the air and the exhaust gas) to the plurality of cylinders 208 for use in a subsequent combustion process.

As part of the combustion process, the plurality of cylinders 208 produce an exhaust gas that flows from the plurality of cylinders 208. A portion of the exhaust gas may flow to the treatment system 212. Another portion of the exhaust gas may be provided to the compressor 202. For example, the engine system 200 may include the EGR system 216, which may be downstream of the turbine 210, and may be configured to divert (e.g., via a control valve) the other portion of the exhaust gas to the compressor 202.

The turbine 210 may be located to receive the exhaust gas and may be connected to the compressor 202 of via a common shaft 218. As the exhaust gas flows through the turbine 210 and expands against vanes thereof, the turbine 210 may rotate and drive the compressor 202 to pressurize air (or air and exhaust gas).

The turbine 210, the compressor, 202, and the common shaft 218 may form a turbocharger, such as a VGT 220 shown in FIG. 2. The turbine 210 may be a variable geometry turbine that includes one or more adjustable vanes, such that a distance between the one or more adjustable vanes may be changed to alter a performance of the VGT 220. For example, the adjustable vanes may be extended to a "closed" position or may be retracted to an "open" position, which may control how much the common shaft 218 rotates and may therefore cause more or less of the energy from the flow of the exhaust gas to be transferred to the compressor 202 (e.g., via the common shaft 218). This may cause the compressor 202 to modify (e.g., increase or decrease) a flow of air (and/or a flow of air and exhaust gas) to the ITV 204.

The treatment system 212 may include a particulate collection device, such as a diesel particulate filter (DPF), an exhaust aftertreatment device (e.g., an aftertreatment selective catalytic reduction (SCR) device), and/or another exhaust gas treatment device, that conditions the portion of the exhaust gas (e.g., the portion of the exhaust gas that is not provided to the compressor 202) before it exits from the engine system 200 to the atmosphere. The particulate collection device may be configured to remove particulate matter from the portion of the exhaust gas through a regeneration process, which requires the temperature of the portion of the exhaust gas entering the particulate collection device to be high enough (e.g., greater than 150° C., 200° C., and/or 250° C., among other examples), in combination with a catalyst, to burn away trapped particulates. As part of the regeneration process, heat from the portion of the exhaust gas is applied to the trapped particulates to elevate the temperature thereof to an ignition threshold. The exhaust aftertreatment device may trap or convert particular constituents (e.g., NOx) in the portion of the exhaust gas. Similar to the particulate collection device, the temperature of the exhaust gas entering the exhaust aftertreatment device needs to be high enough, in combination with an oxidation catalyst and a reductant, to react with NOx in the portion of the exhaust gas to form water ($H_2O$) and elemental nitrogen ($N_2$).

The controller 180, as described further herein, may provide control of the engine system 200 and/or components of the engine system 200. The controller 180 may be implemented as a processor, such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor may be implemented in hardware, firmware, and/or a combination of hardware and software. The controller 180 may include one or more processors capable of being programmed to perform a function. One or more memories, including a random-access memory (RAM), a read only memory (ROM), and/or another type of dynamic or static storage device (e.g., a flash memory, a magnetic memory, and/or an optical memory) may store information and/or instructions for use by the controller 180. The controller 180 may include a memory (e.g., a non-transitory computer-readable medium) capable of storing instructions, that when executed, cause the processor to perform one or more processes and/or methods described herein.

The sensor system 214 may provide measurements associated with various parameters used by the controller 180 to enable control of the engine system 200 and/or components of the engine system 200. The sensor system 214 may include physical sensors and/or any appropriate type of control system that generates values of sensing parameters based on a computational model and/or one or more measured parameters. As used herein, sensing parameters may refer to those measurement parameters that are directly measured and/or estimated by one or more sensors (e.g., physical sensors, virtual sensors, and/or other sensors). Example sensors may include temperature sensors (e.g., to measure a temperature of the exhaust gas at the VGT 220 and/or the treatment system 212), speed sensors (e.g., to measure a speed of the engine of engine system 200, such as in terms of revolutions per minute (RPM), and/or a speed of machine 100, such as in terms of kilometers per hour or miles per hour), fuel rate sensors (e.g., to measure a fuel rate corresponding to a quantity of fuel (a fuel flow) provided to the plurality of cylinders 208, such as in terms of a volume (in cubic millimeters) of fuel injected by an injector into a cylinder 208), chemical composition sensors (e.g., to measure an amount of NOx in exhaust gas), pressure sensors (e.g., to measure a pressure, such as an intake manifold absolute pressure (IMAP) associated with the intake manifold 206 and/or an outlet pressure of the compressor 202, such as in terms of kilopascals (kPa)), engine airflow sensors (e.g., to measure an engine airflow rate, such as in terms of cubic meters per minute, cubic feet per minute, and/or the like), and/or other sensors. Sensing parameters may also include any output parameters that may be measured indirectly by physical sensors and/or calculated based on readings of physical sensors.

As indicated above, FIG. 2 is provided as an example. Other examples may differ from what is described in connection with FIG. 2.

Figure 3:
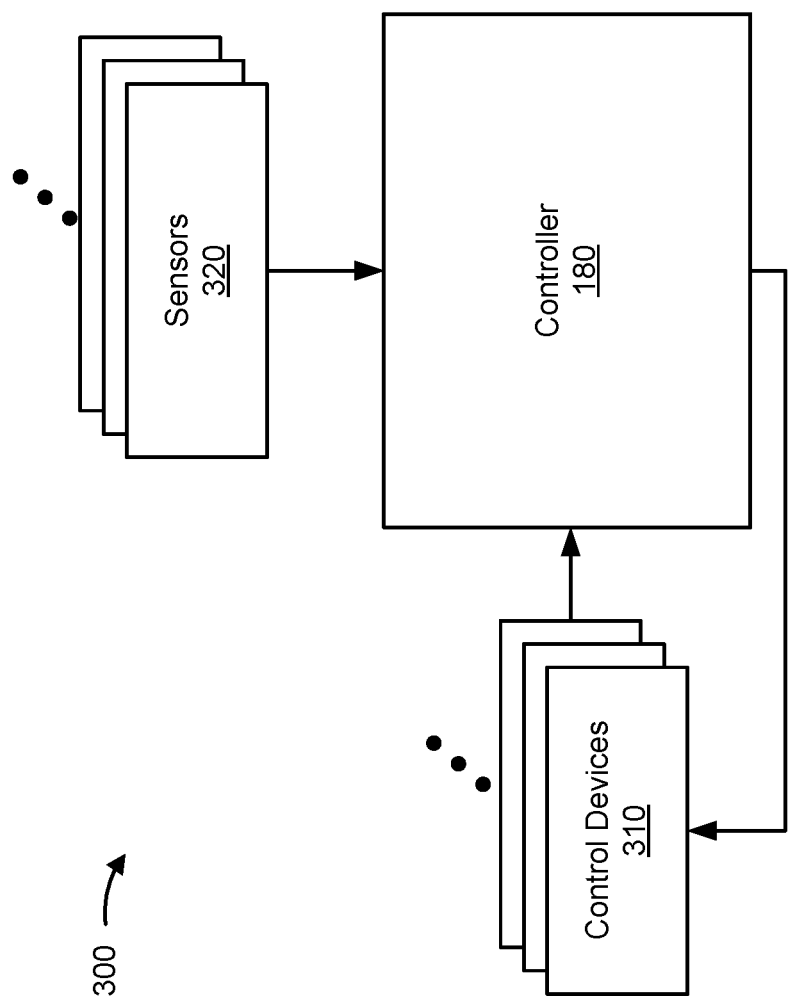
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include one or more control devices 310 (referred to individually as "control device 310" and collectively as "control devices 310"), one or more sensors 320 (referred to individually as "sensor 320" and collectively as "sensors 320"), and the controller 180. Devices and/or components of environment 300 may interconnect via wired connections, wireless connections, or a combination of wired and wireless connections.

A control device 310 may be any type of device that may be used by the controller 180 to control a performance feature of the engine system 200. For example, the control device 310 may include one or more actuators, switches, and/or the like that are capable of controlling a component of the engine system 200. The control device 310 may be capable of causing adjustment of one or more components of the VGT 220, such as one or more adjustable vanes of the turbine 210 of the VGT 220 (e.g., from a first vane position to a second vane position), and/or causing adjustment of the ITV 204 (e.g., from a first ITV position to a second ITV position), among other examples. The sensors 320 may include any type of sensor configured to measure operating conditions of the engine system 200. The sensors 320 may be sensors of the sensor system 214, as described herein.

The controller 180 may include one or more devices configured to control one or more components of the engine system 200. For example, the controller 180 may be configured to control the VGT 220 and/or the ITV 204, such as to change (e.g., to control) an outlet pressure of the compressor 202 of the VGT 220, a temperature of an exhaust gas of the engine system 200, and/or an intake manifold absolute pressure (IMAP) of the intake manifold 206, among other examples. The controller 180 may control the one or more components of the engine system 200 by sending one or more commands to the control device 310.

The controller 180 may obtain information concerning the engine system 200 from the sensors 320 (e.g., directly from the sensors 320 or via one or more other components or devices of the engine system 200, such as a different controller). For example, the controller 180 may obtain information concerning a speed of an engine of the engine system 200, information concerning a load of the engine, and/or information concerning one or more fuel delivery parameters of the engine. The one or more fuel delivery parameters may include a start of injection timing (SOI), a start of injection pressure (SOIP) (e.g., a fuel pressure at a beginning of injection), one or more injection strategies (e.g., that indicate a number of injection events per engine cycle, a presence of an injection plot, and/or post injection events, among other examples), an injection duration, and/or a mass of injected fuel, among other examples. As another example, the controller 180 may obtain information concerning an outlet pressure of the compressor 202 of the VGT 220, a temperature of an exhaust gas of the engine (e.g., at the VGT 220 and/or the at the treatment system 212), and/or information concerning the IMAP of the intake manifold 206, among other examples. In an additional example, the controller 180 may obtain information concerning a setting of the ITV 204 (e.g., an "open" setting, a "closed" setting, or a "partially open" setting, that indicates a position of the ITV 204), information concerning a setting of the VGT 220 (e.g., an "open" setting, a "closed" setting, or a "partially open" setting, that indicates a position of at least one component, such as at least one adjustable vane, of the turbine 210 of the VGT 220), information concerning a speed of the VGT 220 (e.g., a speed of the turbine 210 of the VGT 220), and/or information concerning a speed of the machine 100, among other examples.

The controller 180 may identify a desired outlet pressure of the compressor 202 of the VGT 220 and/or a desired temperature of an exhaust gas of the engine of the engine system 200 (e.g., at the VGT 220 and/or the at the treatment system 212), such as based on the information concerning the engine system 200 that the controller 180 obtained from the sensors 320. For example, the controller 180 may search a data structure (e.g., a database, a data map, an electronic file, or another data structure), based on the information concerning the engine system 200, to identify one or more entries of the data structure that indicate the desired outlet pressure of the compressor 202 and/or the desired temperature of the exhaust gas of the engine. In a particular example, the controller 180 may determine a speed of the engine (e.g., that is indicated by the information concerning the speed of the engine that the controller 180 obtained from the sensors 320), and may determine, based on the speed of the engine (e.g., by searching the data structure based on the speed of the engine), the desired outlet pressure of the compressor 202 and/or the desired temperature of the exhaust gas of the engine.

The desired outlet pressure of the compressor 202 of the VGT 220 may be associated with reducing a transient response time of the engine (e.g., reducing an amount of time for the engine to produce power to meet a change in load). The desired temperature of the exhaust gas of the engine may be associated with reducing emission levels in the exhaust gas (e.g., a minimum temperature of the exhaust gas for enabling a regeneration process to reduce an amount of particulate matter in the exhaust gas and/or for enabling a aftertreatment process to reduce an amount of toxic compounds in the exhaust gas). Accordingly, the desired outlet pressure of the compressor 202 may be a desired minimum outlet pressure of the compressor 202 and the desired temperature of the exhaust gas may be a desired minimum temperature of the exhaust gas.

The controller 180 may identify one or more sets of potential parameters associated with operation of the engine of the engine system 200 (e.g., to facilitate controlling the VGT 220 and the ITV 204, as described herein). For example, each set of potential parameters may include a potential setting of the turbine 210 of the VGT 220, a potential setting of the ITV 204, a potential IMAP of the intake manifold 206, one or more potential fuel delivery parameters associated with the engine (e.g., a potential SOI, a potential SOIP, one or more potential injection strategies, a potential injection duration, and/or a potential mass of injected fuel, among other examples), a potential flow rate of the exhaust gas in the EGR system of the engine, and/or other potential parameters.

Accordingly, the controller 180 may determine one or more sets of predicted values (e.g., based on the desired outlet pressure of the compressor 202, the desired temperature of the exhaust gas, and/or the one or more sets of potential parameters). The one or more sets of predicted values may be respectively associated with the one or more sets of potential parameters (e.g., each set of predicted values is associated with a set of potential parameters of the one or more sets of potential parameters). Each set of predicted values may include a predicted outlet pressure of the compressor 202 and/or a predicted temperature of the exhaust gas. For example, the controller 180 may use a model (e.g., a prediction model, a simulation model, and/or another type of model) to process the desired outlet pressure of the compressor 202, the desired temperature of the exhaust gas, and/or a set of potential parameters, of the one or more sets of potential parameters, to determine a set of predicted values of the one or more sets of predicted values.

The controller 180 may determine respective scores of the one or more sets of predicted values. For example, the controller 180 may determine, for a set of predicted values that includes a predicted outlet pressure of the compressor 202 and/or a predicted temperature of the exhaust gas of the engine of the engine system 200, a score for the set of predicted values based on whether the predicted outlet pressure of the compressor 202 is greater than or equal to the desired outlet pressure of the compressor 202 and/or whether the predicted temperature of the exhaust gas of the engine is greater than or equal to the desired temperature of the exhaust gas.

As another example, the controller 180 may use a scoring function, such as a cost function, to determine the respective scores of the one or more sets of predicted values. The controller 180, using the cost function, may calculate, for a set of predicted values that includes a predicted outlet pressure of the compressor 202 and/or a predicted temperature of the exhaust gas of the engine of the engine system 200, one or more first costs associated with a predicted outlet pressure of the compressor 202 being less than the desired outlet pressure of the compressor 202 and/or one or more second costs associated with a predicted temperature of the exhaust gas of the engine being less than the desired temperature of the exhaust gas. The controller 180 may therefore determine a score for the set of predicted values by applying a first weighting factor to the one or more first costs and/or by applying a second weighting factor to the one or more second costs, and by summing the one or more first costs and/or the one or more second costs. Accordingly, when the respective scores of the one or more sets of predicted values are determined using a cost function, a set of predicted values with a score that is less than a score of another set of predicted values may indicate that the set of predicted values is more desirable than the other set of predicted values.

The controller 180 may select a particular set of predicted values of the one or more sets of predicted values (e.g., based on the respective scores of the one or more sets of predicted values). For example, when the respective scores of the one or more sets of predicted values are determined using a cost function, the controller 180 may select a set of predicted values, from the one or more sets of predicted values, that has a score that is less than or equal to each score of the other sets of predicted values of the one or more sets of predicted values. That is, the controller 180 may select a particular set of predicted values that has a score that is more desirable than, or is at least as desirable as, scores of other sets of predicted values of the one or more sets of predicted values.

The controller 180 may control one or more components of the engine system 200, such as the VGT 220 (e.g., the turbine 210 of the VGT 220) and/or the ITV 204 (e.g., based on the particular set of predicted values). For example, the controller 180 may identify a particular set of potential parameters, of the one or more sets of potential parameters, that is associated with the particular set of predicted values and may control the one or more components of the engine system 200 based on the particular set of potential parameters.

In a specific example, when the particular set of potential parameters includes a particular potential setting of the turbine 210 of the VGT 220, the controller 180 may control the turbine 210 of the VGT 220 by causing the turbine 210 of the VGT 220 to adjust, or to not adjust, according to the particular potential setting of the turbine 210 of the VGT 220. For example, the controller 180 may cause the turbine 210 of the VGT 220 to adjust to the particular potential setting of the turbine 210 of the VGT 220 (or to adjust to a similar setting). In this way, the controller 180 may cause at least one component (e.g., at least one adjustable vane) of the turbine 210 of the VGT 220 to adjust from a first position (e.g., a first vane position) to a second position (e.g., a second vane position), such as a second position that is indicated by the particular potential setting of the turbine 210 of the VGT 220. As another example, when the turbine 210 of the VGT 220 is already set to the particular potential setting of the turbine 210 of the VGT 220, the controller 180 may cause the turbine 210 of the VGT 220 to remain at the particular potential setting of the turbine 210 of the VGT 220 (e.g., may cause the turbine 210 of the VGT 220 to refrain from adjusting). In this way, the controller 180 may cause at least one component (e.g., at least one adjustable vane) of the turbine 210 of the VGT 220 to refrain from adjusting from a position that is indicated by the particular potential setting of the turbine 210 of the VGT 220.

In another specific example, when the particular set of potential parameters includes a particular potential setting of the ITV 204, the controller 180 may control the ITV 204 by causing the ITV 204 to adjust, or to not adjust, according to the particular potential setting of the ITV 204. For example, the controller 180 may cause the ITV 204 to adjust to the particular potential setting of the ITV 204 (or to adjust to a similar setting). In this way, the controller 180 may cause the ITV 204 to adjust from a first position (e.g., a first ITV position) to a second position (e.g., a second ITV position), such as a second position that is indicated by the particular potential setting of the ITV 204. As another example, when the ITV 204 is set to the particular potential setting of the ITV 204, the controller 180 may cause the ITV 204 to remain at the particular potential setting of the ITV 204 (e.g., cause the ITV 204 to refrain from adjusting). In this way, the controller 180 may cause the ITV 204 to refrain from adjusting from a position that is indicated by the particular potential setting of the ITV 204.

By controlling the one or more components of the engine system 200, such as by controlling the VGT 220 (e.g., turbine 210 of the VGT 220) and/or the ITV 204, as described herein, the controller 180 may cause an outlet pressure of the compressor 202 to change and/or may cause a temperature of the exhaust gas of the engine of the engine system 200 to change (e.g., at the VGT 220 and/or at the treatment system 212). For example, controlling the VGT 220 and/or the ITV 204 may cause the outlet pressure of the compressor 202 to be greater than or equal to the desired outlet pressure of the compressor 202 (e.g., and therefore a transient response time of the engine of the engine system 200 may be reduced, as described herein). As another example, controlling the VGT 220 and/or the ITV 204 may cause the temperature of the exhaust gas of the engine of the engine system 200 to be greater than or equal to the desired temperature of the exhaust gas (e.g., and therefore emission levels in the exhaust gas may be reduced, as described herein). In an additional example, controlling the VGT 220 and/or the ITV 204 may cause the IMAP of the intake manifold 206 to change, such as by causing the IMAP of the intake manifold 206 to be less than or equal to a desired IMAP of the intake manifold 206 (e.g., a maximum IMAP that is associated with providing enough airflow to the cylinders 208 to allow the cylinders 208 to facilitate causing the temperature of the exhaust gas of the engine of the engine system 200 to be greater than or equal to the desired temperature of the exhaust gas).

While some implementations described herein concern the controller 180 causing adjustable vanes of the turbine 210 of the VGT 220 to adjust (e.g., from a first vane position to a second vane position), implementations also include the controller 180 causing one or more other components of the VGT 220 to adjust. For example, the controller 180 may cause an adjustable intake or an adjustable outlet of the turbine 210 of the VGT 220 to adjust. As another example, the controller 180 may cause an adjustable flow area control element of the turbine 210 of the VGT 220 to adjust. Accordingly, the controller 180 may cause the one or more other components of the turbine 210 of the VGT 220 to adjust when causing (or instead of causing) the adjustable vanes of the turbine 210 of the VGT 220 to adjust.

The number and arrangement of devices and networks shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
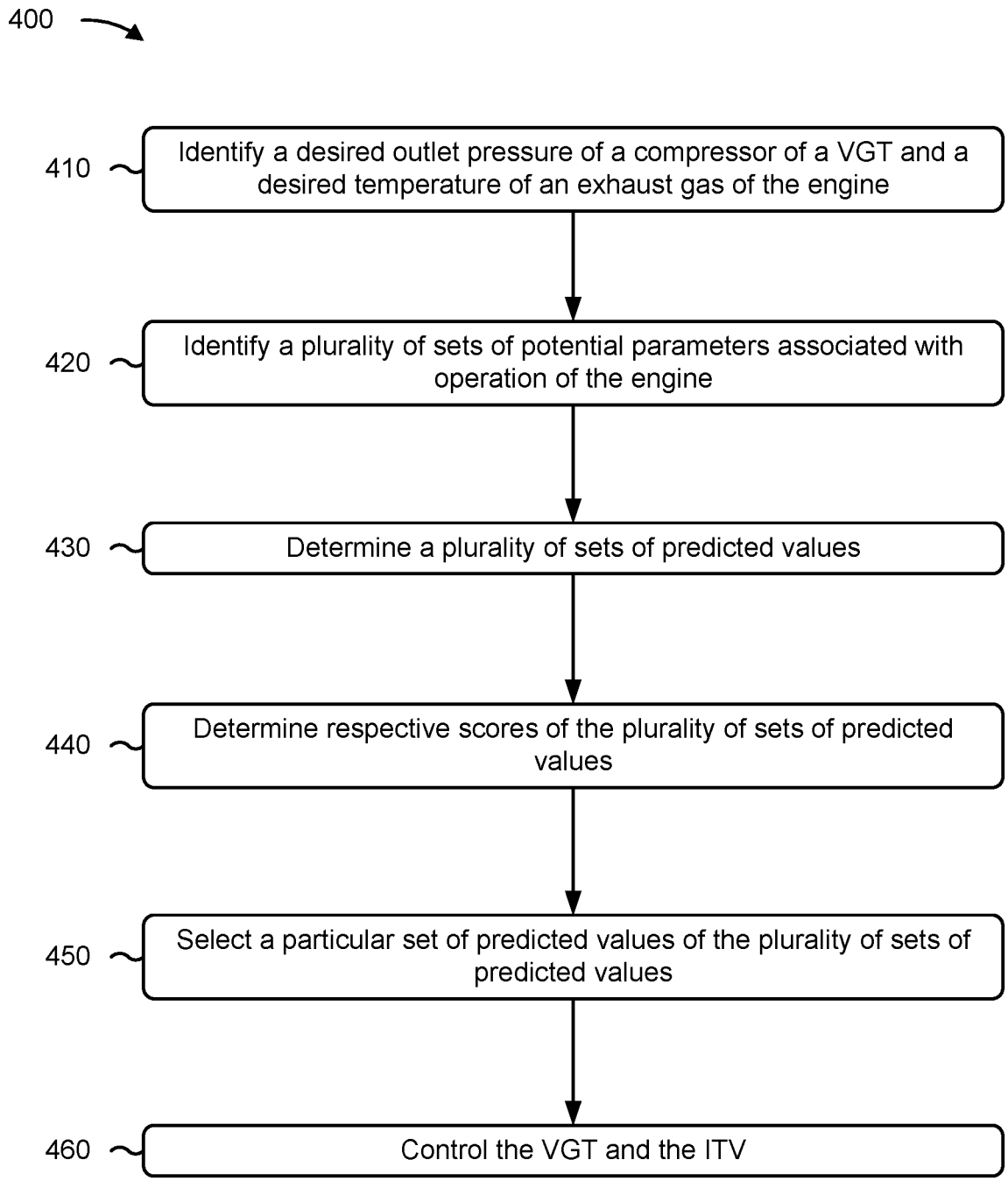
FIG. 4 is a flowchart of an example process associated with controlling a VGT and an ITV to optimize exhaust gas temperature and compressor outlet pressure of an engine.

FIG. 4 is a flowchart of an example process 400 associated with controlling a VGT and an ITV to optimize exhaust gas temperature and compressor outlet pressure of an engine. One or more process blocks of FIG. 4 may be performed by a controller (e.g., the controller 180). In some implementations, one or more process blocks of FIG. 4 may be performed by another device or a group of devices separate from or including the controller, such as a control device (e.g., the control device 310) and/or a sensor (e.g., the sensor 320).

As shown in FIG. 4, process 400 may include identifying a desired outlet pressure of a compressor of a VGT and a desired temperature of an exhaust gas of the engine (block 410). For example, the controller may identify a desired outlet pressure of a compressor of a VGT and a desired temperature of an exhaust gas of the engine, as described above.

As further shown in FIG. 4, process 400 may include identifying a plurality of sets of potential parameters associated with operation of the engine (block 420). For example, the controller may identify a plurality of sets of potential parameters associated with operation of the engine, as described above. Each set of potential parameters includes a potential setting of a VGT (e.g., of a turbine of the VGT) of the engine and a potential setting of an ITV of the engine.

As further shown in FIG. 4, process 400 may include determining a plurality of sets of predicted values (block 430). For example, the controller may determine a plurality of sets of predicted values (e.g., based on the desired outlet pressure of the compressor, the desired temperature of the exhaust gas, and/or the plurality of sets of potential parameters), as described above. Each set of predicted values includes a predicted outlet pressure of the compressor and a predicted temperature of the exhaust gas, and each set of predicted values is associated with a set of potential parameters of the plurality of sets of potential parameters.

As further shown in FIG. 4, process 400 may include determining respective scores of the plurality of sets of predicted values (block 440). For example, the controller may determine respective scores of the plurality of sets of predicted values, as described above.

As further shown in FIG. 4, process 400 may include selecting a particular set of predicted values of the plurality of sets of predicted values (block 450). For example, the controller may select a particular set of predicted values of the plurality of sets of predicted values (e.g., based on the respective scores of the plurality of sets of predicted values), as described above.

As further shown in FIG. 4, process 400 may include controlling the VGT and the ITV (block 460). For example, the controller may control the VGT (e.g., the turbine of the VGT) and the ITV (e.g., based on a particular set of potential parameters of the plurality of sets of potential parameters that is associated with the particular set of predicted values), as described above. Controlling the VGT and the ITV causes at least one of an outlet pressure of the compressor to be greater than or equal to the desired outlet pressure of the compressor, or a temperature of the exhaust gas to be greater than or equal to the desired temperature of the exhaust gas.

Although FIG. 4 shows example blocks of process 400, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

The above-described techniques allow a controller 180 of an engine (e.g., associated with engine system 200) of a machine 100 to control a VGT 220 (e.g., a turbine 210 of the VGT 220) and/or an ITV 204 of the engine. In this way, the controller 180 causes an outlet pressure of a compressor 202 of the VGT 220 to change and/or causes a temperature of the exhaust gas of the engine to change. For example, the controller 180 may cause the outlet pressure of the compressor 202 to be greater than or equal to a desired outlet pressure of the compressor 202. This enables a high-enough pressure to be provided at the compressor 202 such that an increased flow of air (or air and exhaust gas) is able to flow from the compressor 202 to an intake manifold 206 of the engine when the ITV 204 is adjusted (e.g., to an "open" setting) in response to a sudden change in load of the engine. This increases an air-to-fuel ratio in the engine, and, accordingly, a transient response time of the engine is reduced (as compared to an engine that does not utilize the controller described herein). For example, the transient response time may be reduced to be less than or equal to 10 milliseconds, 100 milliseconds, 200 milliseconds, 500 milliseconds, 1 second, 2 seconds, and/or 4 seconds.

As another example, the controller 180 may cause the exhaust gas of the engine to be greater than or equal to a desired temperature of an exhaust gas of the engine. This allows a treatment system 212 of the engine (e.g., that comprises a particulate collection device and/or an after-treatment device) to remove and/or convert particulate matter and/or other emissions in an exhaust gas of the engine such that emission levels in the exhaust gas are reduced. This is beneficial in situations when the engine cannot generate sufficiently hot exhaust gas, such as in low ambient temperatures, when the engine is idle, and/or during engine braking procedures when fuel is not injected into engine cylinders, among other examples.

Moreover, controlling the VGT 220 and/or the ITV 204 as described herein, allows the controller 180 to maintain a performance of the engine (e.g., without degrading a performance of the machine 100).

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   identifying, by a controller, a desired outlet pressure of a compressor of a variable geometry turbocharger (VGT) and a desired temperature of an exhaust gas of an engine;
   identifying, by the controller, a plurality of sets of potential parameters associated with operation of the engine, wherein each set of potential parameters includes a potential setting of a turbine of the VGT of the engine and a potential setting of an intake throttle valve (ITV) of the engine;
   determining, by the controller, using a model, and based on the desired outlet pressure of the compressor, the desired temperature of the exhaust gas, and the plurality of sets of potential parameters, a plurality of sets of predicted values,
      wherein each set of predicted values includes a predicted outlet pressure of the compressor and a predicted temperature of the exhaust gas, and
      wherein each set of predicted values is associated with a set of potential parameters of the plurality of sets of potential parameters;
   determining, by the controller, respective scores of the plurality of sets of predicted values;
   selecting, by the controller and based on the respective scores of the plurality of sets of predicted values, a particular set of predicted values of the plurality of sets of predicted values; and
   controlling, by the controller and based on a particular set of potential parameters of the plurality of sets of potential parameters that is associated with the particular set of predicted values, the turbine of the VGT and the ITV.

2. The method of claim 1, wherein identifying the desired outlet pressure of the compressor of the VGT comprises:
   determining a speed of the engine; and
   determining, based on the speed of the engine, the desired outlet pressure of the compressor.

3. The method of claim 1, wherein each set of potential parameters also includes at least one of:
   a potential intake manifold absolute pressure (IMAP) of an intake manifold of the engine;
   one or more potential fuel delivery parameters associated with the engine; or
   a potential flow rate of the exhaust gas in an exhaust gas recirculation (EGR) system of the engine.

4. The method of claim 1, wherein the respective scores of the plurality of sets of predicted values are determined using a cost function, and
   wherein selecting the particular set of predicted values comprises:
      selecting a set of predicted values, from the plurality of sets of predicted values, that has a score that is less than or equal to each score of non-selected sets of predicted values of the plurality of sets of predicted values.

5. The method of claim 1, wherein the particular set of potential parameters includes a particular potential setting of the turbine of the VGT and a particular potential setting of the ITV, and
wherein controlling the turbine of the VGT and the ITV comprises at least one of:
causing the turbine of the VGT to adjust according to the particular potential setting of the turbine of the VGT; or
causing the ITV to adjust according to the particular potential setting of the ITV.

6. The method of claim 5, wherein causing the turbine of the VGT to adjust according to the particular potential setting of the turbine of the VGT comprises:
causing at least one component of the turbine of the VGT to adjust from a first position to a second position that is indicated by the particular potential setting of the turbine of the VGT.

7. The method of claim 5, wherein causing the ITV to adjust according to the particular potential setting of the ITV comprises:
causing the ITV to adjust from a first position to a second position that is indicated by the particular potential setting of the ITV.

8. The method of claim 1, wherein controlling the turbine of the VGT and the ITV causes at least one of:
an outlet pressure of the compressor to be greater than or equal to the desired outlet pressure of the compressor; or
a temperature of the exhaust gas to be greater than or equal to the desired temperature of the exhaust gas.

9. A machine comprising:
an engine;
a variable geometry turbocharger (VGT);
an intake throttle valve (ITV); and
a controller configured to:
identify one or more sets of potential parameters associated with operation of the engine,
wherein each set of potential parameters includes a potential setting of a turbine of the VGT and a potential setting of the ITV of the engine;
determine, using a model, one or more sets of predicted values that are respectively associated with the one or more sets of potential parameters,
wherein each set of predicted values includes a predicted outlet pressure of a compressor of the VGT and a predicted temperature of an exhaust gas of the engine;
determine respective scores of the one or more sets of predicted values;
select, based on the respective scores of the one or more sets of predicted values, a particular set of predicted values of the one or more sets of predicted values; and
control, based on the particular set of predicted values of the one or more sets of predicted values, the turbine of the VGT and the ITV.

10. The machine of claim 9, wherein the controller, to control the turbine of the VGT and the ITV, is configured to at least one of:
cause the turbine of the VGT to adjust according to a particular potential setting of the turbine of the VGT that is indicated by a particular set of potential parameters, of the one or more sets of potential parameters, that is associated with the particular set of predicted values; or
cause the ITV to adjust according to a particular potential setting of the ITV that is indicated by the particular set of potential parameters.

11. The machine of claim 10, wherein the controller, to cause the turbine of the VGT to adjust according to the particular potential setting of the turbine of the VGT, is configured to:
cause at least one component of the turbine of the VGT to adjust from a first position to a second position that is indicated by the particular potential setting of the turbine of the VGT.

12. The machine of claim 10, wherein the controller, to cause the ITV to adjust according to the particular potential setting of the ITV, is configured to:
cause the ITV to adjust from a first position to a second position that is indicated by the particular potential setting of the ITV.

13. The machine of claim 9, wherein controlling the turbine of the VGT and the ITV causes at least one of:
an outlet pressure of the compressor to change; or
a temperature of an exhaust gas of the engine to change.

14. A system comprising:
an engine;
a variable geometry turbocharger (VGT);
an intake throttle valve (ITV); and
a controller configured to:
identify one or more sets of potential parameters associated with operation of the engine,
wherein each set of potential parameters includes a potential setting of a turbine of the VGT and a potential setting of the ITV of the engine;
determine, using a model, one or more sets of predicted values that are respectively associated with the one or more sets of potential parameters,
wherein each set of predicted values includes a predicted outlet pressure of a compressor of the VGT and a predicted temperature of an exhaust gas of the engine;
select a particular set of predicted values of the one or more sets of predicted values; and
control, based on the particular set of predicted values of the one or more sets of predicted values, the turbine of the VGT and the ITV.

15. The system of claim 14, wherein the controller, to control the turbine of the VGT, is configured to:
cause the turbine of the VGT to adjust, or to not adjust, according to a particular potential setting of the turbine of the VGT that is indicated by a particular set of potential parameters, of the one or more sets of potential parameters, that is associated with the particular set of predicted values.

16. The system of claim 14, wherein the controller, to control the ITV, is configured to:
cause the ITV to adjust, or to not adjust, according to a particular potential setting of the ITV that is indicated by a particular set of potential parameters, of the one or more sets of potential parameters, that is associated with the particular set of predicted values.

17. The system of claim 14, wherein controlling the turbine of the VGT and the ITV causes at least one of:
an outlet pressure of the compressor to change; or
a temperature of the exhaust gas of the engine to change.

18. The system of claim 14, wherein the controller, to select the particular set of predicted values of the one or more sets of predicted values, is configured to:
  determine, using a scoring function, respective scores of the one or more sets of predicted values; and
  select, based on the respective scores of the one or more sets of predicted values, the particular set of predicted values.

19. The system of claim 18, wherein the scoring function is a cost function, and
  wherein the controller, to select the particular set of predicted values of the one or more sets of predicted values, is configured to:
    select a set of predicted values, from the one or more sets of predicted values, that has a score that is less than or equal to each score of non-selected sets of predicted values of the one or more sets of predicted values.

20. The system of claim 14, wherein the controller, to determine, using the model, the one or more sets of predicted values that are respectively associated with the one or more sets of potential parameters, is configured to:
  determine, using the model and based on a set of potential parameters, of the one or more sets of potential parameters, a set of predicted values of the one or more sets of predicted values.

* * * * *